Patented Aug. 5, 1947

2,425,058

UNITED STATES PATENT OFFICE 2,425,058

MIXTURES OF TITANIUM DIOXIDE AND CALCIUM-STARCH-METABORATE AS PIGMENTS (IN PAPER AND IN PAINT)

William L. Craig, Westport, Conn., assignor to R. T. Vanderbilt Company, Inc., New York, N. Y., a corporation of New York No Drawing. Application September 5, 1945, Serial No. 614,618

2 Claims. (Cl. 106—308)

This invention relates to improvements in titanium dioxide pigments. The improved pigment of my invention is an intimate mixture of titanium dioxide and calcium-starch-metaborate.

The material to which I refer as "calcium-starch-metaborate" is the borate product described in my application filed June 16, 1945, Serial No. 599,957. This calcium-starch-metaborate is a pigment formed by a two-step process in which starch is reacted with calcium chloride to form a gel which is then reacted with sodium tetraborate to precipitate the borate pigment in the form of an insoluble calcium-starch-meta-borate complex. I have discovered that aqueous solutions of calcium chloride of sufficient concentration with respect to calcium chloride will react with raw starch to produce a complex from which the improved borate pigment can be precipitated. Concentrations approaching saturation with respect to calcium chloride are required to effect the reaction. For example, solutions containing 55% by weight of $CaCl_2$ on the aqueous component will react whereas the reaction virtually ceases if the solution is diluted to a concentration of 35% by weight of $CaCl_2$ on the aqueous component. I am referring to reaction at ordinary temperatures, 20°–25° C., and approximately at neutrality, for example, at a pH of 6.5–7.5. The reaction requires a different period with different starches, depending upon the make-up of the covering of the individual starch particles. With potato starch as an example of an easily processed starch, the reaction will be virtually complete in a matter of minutes, sometimes as little as two or three minutes, whereas with corn starch, as an example of starch difficult to process, the reaction may require as much as several hours, for example, 3–4 hours.

In carrying out the first step of the process of making the calcium-starch-metaborate pigment, for example, I dissolve calcium chloride in water and filter if necessary to remove any suspended material. I then stir raw starch into this solution, continuing the stirring and maintaining a temperature of about 20°–25° C. until the reaction is complete. With starches which react rapidly, such as potato starch, it is sometimes advantageous to put the starch in a slurry in water and to add in this form rather than to add it directly to the calcium chloride solution. For example, I may dissolve 111 parts by weight of $CaCl_2$ in 200 parts of water, filter, and stir in 12 parts of raw starch. The product of this reaction is then subjected to the second step of my process.

In carrying out the second step of the process of making the calcium-starch-metaborate pigment I precipitate the calcium content of the complex formed in the first step as a calcium borate by appropriate addition of sodium tetraborate. The precipitate is "a calcium borate" in the sense that it is a complex including a reacted starch. For example, I dissolve 382 parts by weight of sodium tetraborate

$(Na_2B_4O_7.10H_2O)$ in 2000 parts of water at a temperature of 40°–70° C. and then add the aqueous reaction product of the first step to the solutions slowly and with continued stirring. As the two solutions mix the resulting solution gradually thickens as precipitation progresses, may even appear to be approaching a dry condition, and finally breaks with separation of a filterable precipitate from a supernatant aqueous layer. The precipitate is the new calcium-starch-metaborate complex or pigment.

This new calcium-starch-metaborate complex, which is itself a valuable pigment complex, is compounded with titanium dioxide, according to the present invention, to make a new composite pigment containing titanium dioxide intimately associated with the calcium-starch-metaborate pigment complex. This is advantageously effected by forming the calcium-starch-metaborate by precipitating the calcium chloride reacted starch with the sodium metaborate in the presence of the titanium dioxide so that the titanium dioxide will be coated by or intimately associated with the precipitated calcium-starch-metaborate pigment complex.

One application in which titanium dioxide pigments have special value is in filling paper stocks to impart opacity and brightness. No other pigment is known which, in equal weight, will impart equivalent opacity and brightness to printing papers, for example.

However, titanium dioxide pigments are expensive and in conventional methods of application losses tend to be incurred. The titanium dioxide pigments are conventionally added, as such, or in aqueous dispersion to a beater preparing the stock for the paper making machine. Losses of pigment in the liquid effluent from the paper making machine amount to as much as 20%-30% or more of the pigment added to the beater.

Put another way, the operator usually expects the retention of pigment in the paper sheet to approximate 70%-80% of the pigment used. Many efforts have been made to improve this retention. The re-cycling of the effluent from the paper making machine to the beater is one of the expedients which has found some acceptance.

However, substantial quantities of pigment nevertheless find their way into the paper mill waste water. The problem is economically important for the cost of the titanium pigment usually is several times the price of the paper product.

I have discovered that I can secure substantial improvements in retention of the titanium dioxide content of such pigments by the addition of my new calcium-starch-metaborate product to the pigment materials supplied to the beater. The proportions in which I have used the calcium-starch-metaborate with advantage approximate 1%-5% by weight on the total of the pigment composition. However, my invention is not limited to the use of these proportions; in the application just described, and any other applications mentioned below, substantially different proportions may be used.

In applying my invention to the filling of paper, I have found it advantageous to proceed as follows: I dissolve sodium tetraborate in water and then disperse a titanium dioxide of water-dispersing type averaging for example about .02 micron in particle size in this solution. I then hydrolyze starch with calcium chloride to produce a clear gel, as above described, and add this gel to the solution first mentioned. The calcium-starch-metaborate complex is thus precipitated on the suspended titanium dioxide. I then filter the resulting pigment mixture from the aqueous component of the suspension and dry it to produce one embodiment of my new product. The sodium chloride content of the pigment mixture may be separated by washing although this is not necessary and may not always be desirable. The titanium dioxide suspension in aqueous sodium tetraborate may consist, for example, of 100 parts (by weight) of titanium dioxide in 300 parts of water with from 3.8 to 19 parts of sodium tetraborate ($Na_2B_4O_7.10H_2O$). The calcium chloride-starch reaction product to be added to this suspension may consist, for example, of from 1.1 parts (by weight) to 5.5 parts of calcium chloride in from 3.5 parts to 17.5 parts of water with from 0.2 to 1.0 part of starch. A series of proportions which may with advantage be jointly used are indicated in each of the vertical columns in the following tabulation, titanium dioxide suspension being indicated by the first three components in each column and the calcium chloride-starch reaction product being indicated by the next three components in each column.

|  | 1 | 2 | 3 | 4 | 5 |
|---|---|---|---|---|---|
| Titanium Dioxide | 100 | 100 | 100 | 100 | 100 |
| $Na_2B_4O_7.10H_2O$ | 3.8 | 7.6 | 11.4 | 15.2 | 19.0 |
| Water | 300 | 300 | 300 | 300 | 300 |

|  | 1 | 2 | 3 | 4 | 5 |
|---|---|---|---|---|---|
| $CaCl_2$ | 1.1 | 2.2 | 3.3 | 4.4 | 5.5 |
| Starch | 0.2 | 0.4 | 0.6 | 0.8 | 1.0 |
| Water | 3.5 | 7.0 | 10.5 | 14.0 | 17.5 |

Any commercial raw starch, potato, tapioca or corn, for example, may be used. In application in paper filling, this new product is wet ground or dry ground and then added to the beater, either dry or re-dispersed in water, in proportions required to give the desired titanium dioxide content in the finished paper sheet.

The new pigment composition of my invention is also useful in the preparation of coating compositions for the processing of paper and in paints and enamels. In these applications, for example, the proportion of calcium-starch-metaborate in the product may range as high as 65%-75% on the total of the pigment composition.

I claim:

1. A pigment composition comprising an intimate mixture of titanium dioxide and calcium-starch-metaborate, the calcium-starch-metaborate being a pigment complex resulting from the precipitation of a calcium chloride reacted starch gel with sodium tetraborate, and the calcium-starch-metaborate being precipitated in the presence of the titanium dioxide.

2. A pigment composition comprising an intimate mixture of titanium dioxide and about 1%-5% by weight on the total of calcium-starch-metaborate, the calcium-starch-metaborate being a pigment complex resulting from the precipitation of a calcium chloride reacted starch gel with sodium tetraborate, and the calcium-starch-metaborate being precipitated in the presence of the titanium dioxide.

WILLIAM L. CRAIG.

REFERENCES CITED

The following references are of record in the file of this patent:

UNITED STATES PATENTS

| Number | Name | Date |
|---|---|---|
| 1,936,152 | Bahr | Nov. 21, 1933 |
| 2,140,394 | Ruff | Dec. 13, 1938 |
| 2,287,161 | Ball | June 23, 1942 |
| 2,388,526 | Creig | Nov. 6, 1945 |
| 2,185,859 | Massey | Jan. 2, 1940 |
| 2,351,683 | Hughes | June 20, 1944 |

FOREIGN PATENTS

| Number | Country | Date |
|---|---|---|
| 486,316 | Great Britain | June 2, 1938 |